(12) United States Patent
Kotrla et al.

(10) Patent No.: US 7,258,394 B2
(45) Date of Patent: Aug. 21, 2007

(54) V-SHAPED FRONT ASSEMBLY OF VEHICLE

(75) Inventors: Keith Kotrla, Newnan, GA (US); Craig Smith, Newnan, GA (US)

(73) Assignee: Yamaha Motor Mfg. Corp. of America, Newnan, GA (US)

( * ) Notice: Subject to any disclaimer, the term of this patent is extended or adjusted under 35 U.S.C. 154(b) by 0 days.

(21) Appl. No.: 11/150,609

(22) Filed: Jun. 10, 2005

(65) Prior Publication Data

US 2006/0279109 A1    Dec. 14, 2006

(51) Int. Cl.
*B60R 19/52*    (2006.01)

(52) U.S. Cl. .................... 296/193.1; 293/115

(58) Field of Classification Search ............ 296/193.1; 293/115; 180/68.6; D12/163, 170, 171
See application file for complete search history.

(56) References Cited

U.S. PATENT DOCUMENTS

| | | | | | |
|---|---|---|---|---|---|
| 2,220,272 | A | * | 11/1940 | Pitura et al. ............ | 293/48 |
| 2,529,998 | A | * | 11/1950 | Burke ...................... | 280/760 |
| 6,439,328 | B1 | * | 8/2002 | Vaillancourt et al. ...... | 180/68.1 |
| 6,460,907 | B2 | | 10/2002 | Usui | |
| D497,850 | S | * | 11/2004 | Dooley ...................... | D12/169 |
| 2004/0140140 | A1 | * | 7/2004 | Guay et al. ................. | 180/210 |

OTHER PUBLICATIONS

Yamaha brochue "2005 Sport ATVs", Marshall Advertising & Design; Las Vegas, NV; Jun. 15, 2004.
Yamaha brochure "2005 Rhino 660 Automatic 4×4"; Marshall Advertising & Design; Las Vegas, NV; Jun. 15, 2004.
Yamaha brochure "2005 Utility ATVs"; Marshall Advertising & Design; Las Vegas, NV; Jun. 15, 2004.
Yamaha brochure, 2005 Sport ATVs.
Yamaha brochure, 2005 Rhino 660 Automatic 4×4.
Yamaha brochure, 2005 Utility ATVs.

* cited by examiner

*Primary Examiner*—Dennis H. Pedder
*Assistant Examiner*—Mike Hernandez
(74) *Attorney, Agent, or Firm*—Keating & Bennett, LLP

(57) ABSTRACT

An all terrain vehicle includes a substantially V-shaped front fender, a substantially V-shaped front carrier bar, and a substantially V-shaped grille. Apexes of the substantially V-shaped front fender, the substantially V-shaped front carrier bar and the substantially V-shaped grille are substantially aligned along a common vertical axis.

9 Claims, 5 Drawing Sheets

V-SHAPED FRONT ASSEMBLY OF VEHICLE

BACKGROUND OF THE INVENTION

1. Field of the Invention

The present invention relates to an all-terrain vehicle (ATV). More specifically, the present invention relates to the arrangement of a front fender, a front carrier bar, and a front grille of an ATV, forming a substantially V-shaped front assembly of the ATV.

2. Description of the Related Art

FIG. 5 illustrates a known all-terrain vehicle (ATV) 101. The ATV 101 includes front wheels 120 provided with low-pressure tires, i.e., balloon tires, and rear wheels 121 provided with low-pressure tires. The front wheels 120 are supported by right and left linkages 130 individually connected to a front lower end portion of the body frame and supported by shock absorbers 133 so as to be able to swing in a vertical plane. The handlebar 122 is operated to control the front wheels 120 for steering.

As shown in FIG. 5, a front carrier rack 131 is mounted on the front fender 107 and permits loading and supporting of baggage thereon from the front side of the ATV 101. Front fender 107 also encloses a pair of headlights 106, as shown in FIG. 5. An engine cooling apparatus 104, such as an air-cooled radiator or an oil or fluid cooled apparatus, is protected by a front bar assembly 150 which includes a lower bars 151 and upper bars 152.

One problem with ATV 101 is that the front bar assembly 150 does not adequately protect the engine and other components located behind it. This is due to the relatively square or rectangular configuration of the front bar assembly 150 and its resulting flat-front configuration of the ATV 101.

Prior Art Reference 1 (Product Brochure of Yamaha Motor Company, Ltd., entitled "2005 GYT-R Accessories," included in the Product Brochure entitled "2005 Sport ATVs") shows a known ATV. The ATV includes a front fender and a front carrier bar that are curved in a rearward direction and are somewhat V-shaped. The headlights are located next to front fender, spaced away from the front carrier bar. A radiator is located behind the front shock absorbers and within the body frame.

One problem with this arrangement of the front fender and the front carrier bar is that the headlights and other engine elements are not well protected. Another problem with this arrangement of the front fender and the front carrier bar is that the air flow to the radiator is obstructed by the body frame and by other elements. Further, the front fender, front carrier bar and other front elements have diverging shapes and configurations which prevents the engine elements from being fully protected from contact and damage caused by foreign objects.

SUMMARY OF THE INVENTION

To overcome the problems described above, preferred embodiments of the present invention provide an all terrain vehicle having a greatly improved front assembly that provides much better protection and airflow for vehicle components located at the front of the ATV.

According to a preferred embodiment of the present invention, a vehicle includes a substantially V-shaped front fender, a substantially V-shaped front carrier bar, a substantially V-shaped grille, wherein apexes of the substantially V-shaped front fender, the substantially V-shaped front carrier bar and the substantially V-shaped grille are substantially aligned along a common vertical axis.

The substantially V-shaped front carrier bar preferably includes left and right upwardly bent portions extending from the apex thereof.

The substantially V-shaped carrier bar also preferably includes two substantially parallel bars connected to each other by curved end portions.

Furthermore, the substantially V-shaped carrier bar preferably includes two substantially vertically extending support bars attached to the two substantially parallel bars, and an air intake shroud is disposed between the two substantially vertically extending support bars. At least a portion of the substantially vertically extending support bars is preferably located behind a front portion of the substantially V-shaped front fender. An outer end of the substantially V-shaped front bar carrier is preferably located behind a front portion of at least one of the substantially V-shaped grille and the substantially V-shaped front fender.

At least one element of an engine of the vehicle is preferably located forward of a front suspension system including a front shock absorber. The at least one element of an engine of the vehicle is preferably an engine cooling apparatus, such as an air-cooled radiator or an oil or fluid cooled apparatus.

The substantially V-shaped front fender and the substantially V-shaped front carrier bar preferably have substantially the same shape and are substantially parallel to each other.

The apex of the substantially V-shaped front fender and one of the apexes of the substantially V-shaped front carrier bar are preferably located at a common vertical height.

The apexes of the substantially V-shaped front fender, the substantially V-shaped front carrier bar and the substantially V-shaped grille are preferably substantially aligned along a common horizontal axis.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
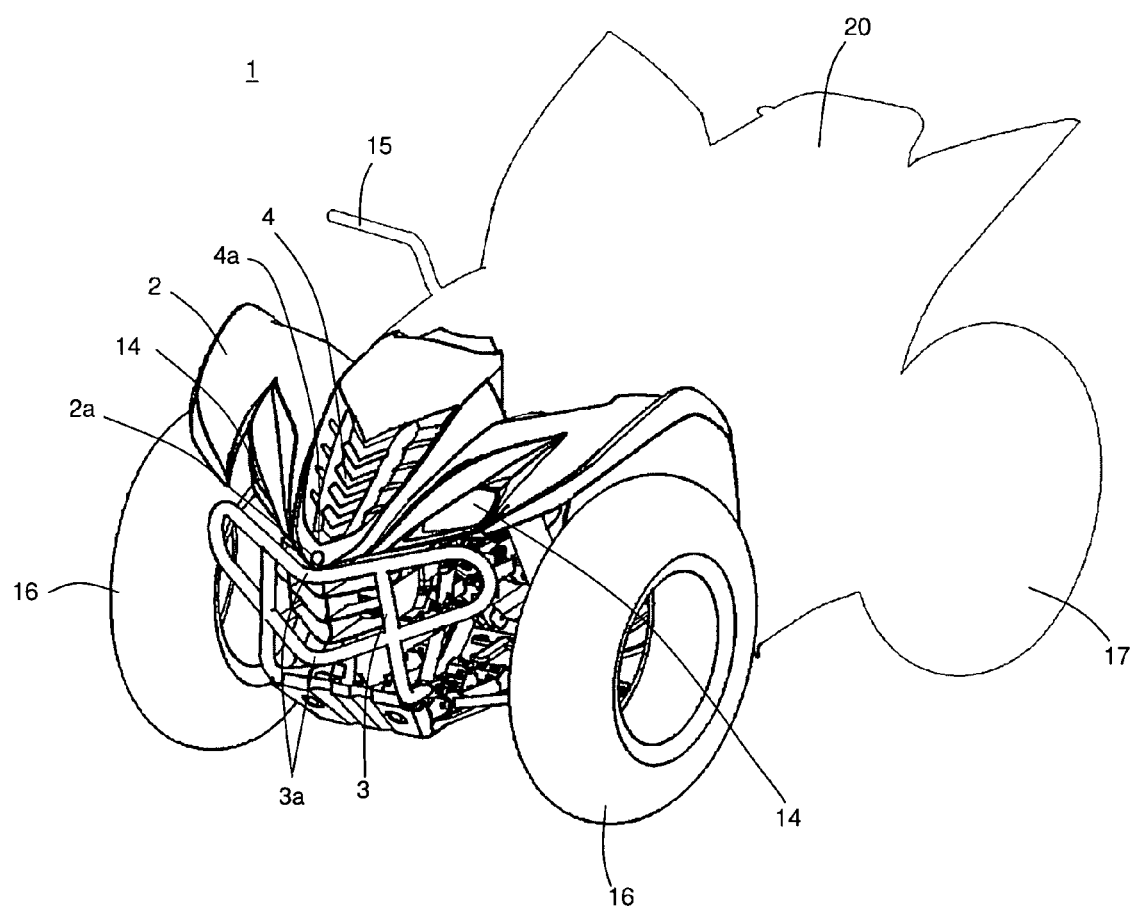
FIG. 1 is an isometric view of an ATV of a preferred embodiment of the present invention.
Figure 2:
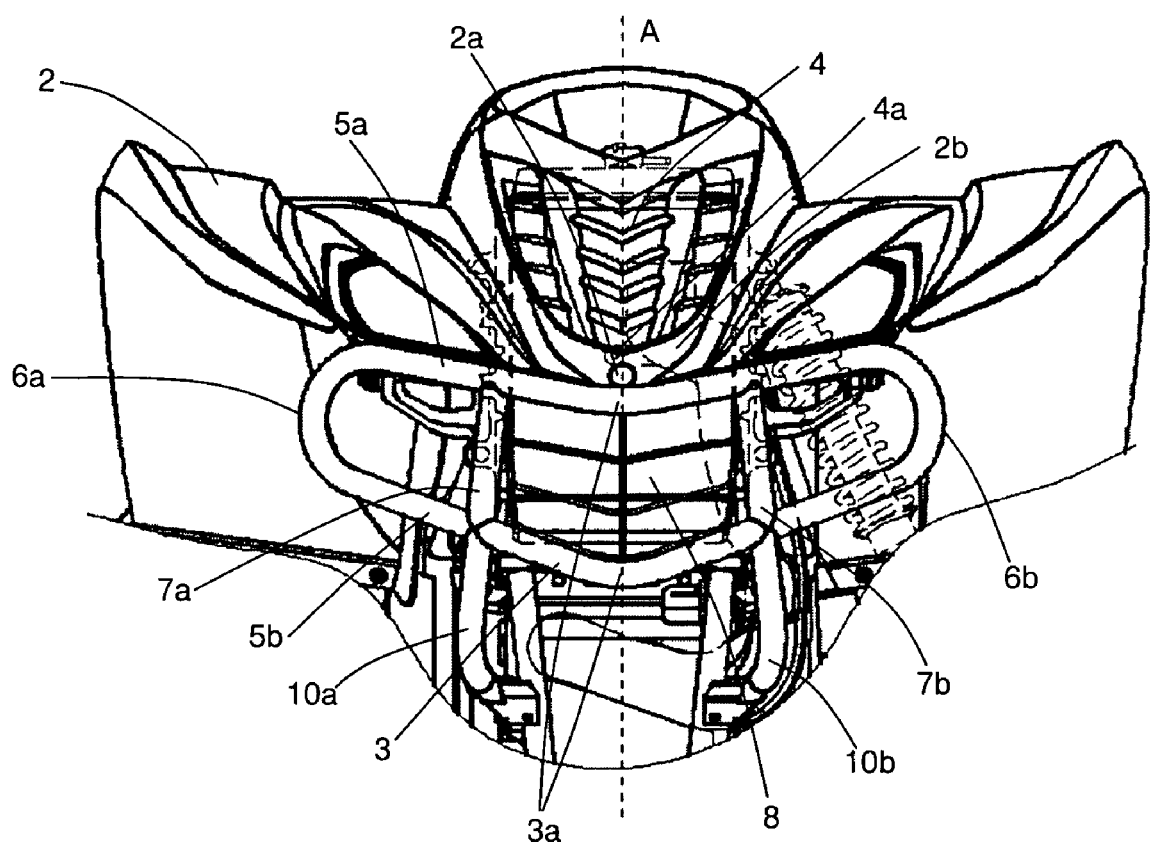
FIG. 2 is a partial front view of the ATV of a preferred embodiment of the present invention.
Figure 3:
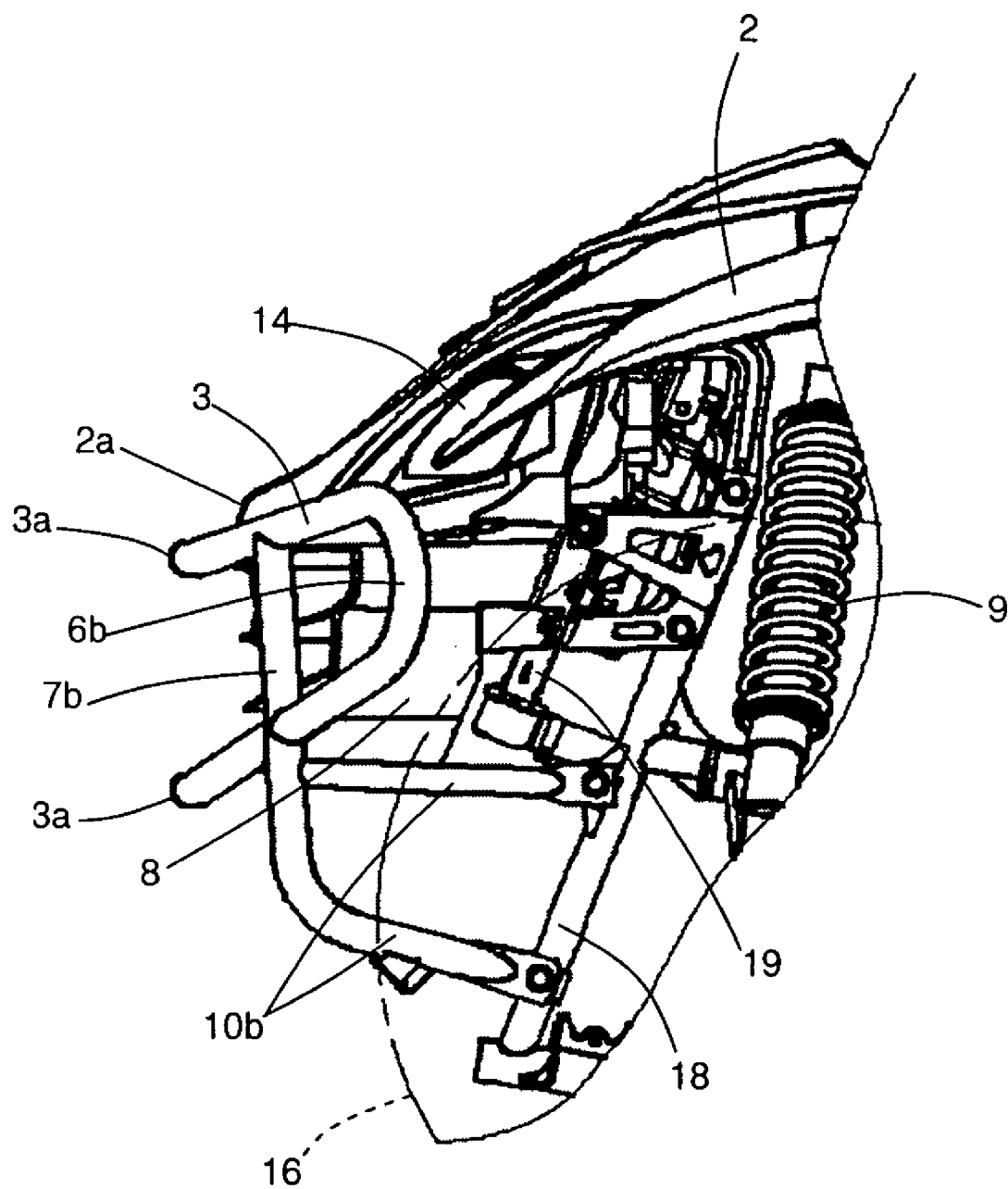
FIG. 3 is a partial side view of the ATV of a preferred embodiment of the present invention.
Figure 4:
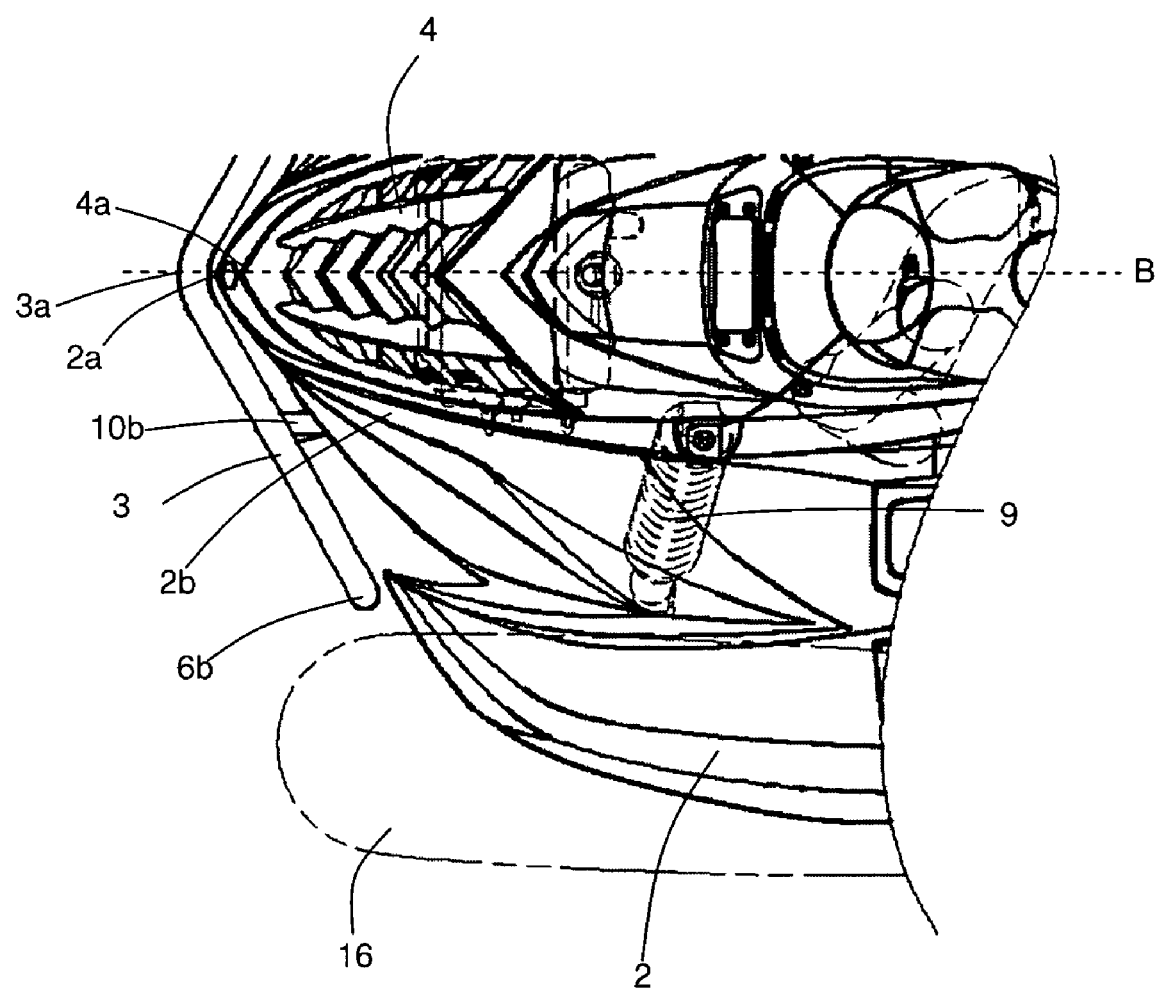
FIG. 4 is a partial top view of a preferred embodiment of the ATV of the present invention.

FIG. 1 is an isometric view of the ATV 1 according to a preferred embodiment of the present invention where the details of the rear portion of the ATV 1 are not included because the details are not necessary for the understanding of the present invention. FIGS. 2-4 are partial front views of the ATV 1. The ATV 1 includes a pair of front wheels 16 and rear wheels 17 (only one rear wheel is shown). The ATV 1 includes, from the front of the ATV 1 to the back of the ATV 1, a front carrier bar 3, a front fender 2 having a grille 4, and a handle bar 15 (only the outline of the handle 15 is shown in FIG. 1). As seen in FIGS. 2 and 3, headlights 14 are disposed above the front carrier bar 3 and are surrounded by the front fender 2. The front carrier bar 3 preferably includes two apexes 3a. The front fender 2 includes apex 2a. The grille 4 includes apex 4a.

As seen in FIGS. 2 and 3, the front carrier bar 3 includes two bars 5a and 5b which are connected by curved portions 6a and 6b and which are substantially parallel to each other. The bars 5a and 5b are also connected by vertical bars 7a and 7b. As seen in FIGS. 2 and 3, the front carrier bar 3 is attached to the body frame 18 by connecting members 10a and 10b.

As seen in FIGS. 2 and 3, each of the bars 5a and 5b extend upwards from the apexes 3a to form a substantial V-shape. Further, as seen in FIG. 4, each of the bars 5a and 5b extend rearwards from the apexes 3a to form a substantial V-shape. That is, the front carrier bar 3 has a substantial V-shape when viewed from the front and when viewed from the top.

As seen in FIGS. 2 and 3, the vertical bars 6a and 6b extend between the bars 5a and 5b. The air intake shroud 8 is located behind the front carrier bar 3 and between the vertical bars 6a and 6b.

As seen in FIGS. 2 and 4, the central portion 2b of the front fender 2 is substantially V-shaped. The central portion 2b of the front fender 2 also includes a grille 4. The grille 4 is also substantially V-shaped and includes an apex 4a.

FIG. 2 clearly shows the arrangement of the front fender 2, the front carrier bar 3, and the grille 4 in the vertical direction when looking at the front of the ATV 1. The apex 2a of the front fender 2, the apexes 3a of the front carrier bar 3, and the apex 4a of the grille 4 are substantially aligned in the vertical direction along line A dividing the ATV 1 in half. FIG. 4 clearly shows the arrangement of the front fender 2, the front carrier bar 3, and the grille 4 in the horizontal direction when looking down at the top of the ATV 1. The apex 2a of the front fender 2, the apexes 3a (the bottom apex 3a is not shown in FIG. 4) of the front carrier bar 3, and the apex 4a of the grille 4 are substantially aligned in the horizontal direction along line B dividing the ATV 1 in half.

As seen in FIG. 4, the front carrier bar 3 and the central portion 2b of the front fender 2 have similar substantially V-shapes when viewed from the top. That is, the bars 5a and 5b (bar 5b is not shown in FIG. 4) are substantially parallel to the outer peripheral edge of the central portion 2b of the front fender 2. Because of this arrangement of the central portion 2b of the front fender 2 and the front carrier bar 3, the headlights 14, radiator 19, air intake shroud 8, the grille 4, and other engine elements are better protected than the headlights 106 and other engine elements shown in FIG. 5.

As seen in FIGS. 3 and 4, the curved portions 6a and 6b (only curved portion 6b is shown in FIG. 4) are preferably located behind the apexes 2a, 3a, and 4a of the front fender 2, the front carrier bar 3, and the grille 4, respectively, along the direction defined by line B. Although not shown in FIGS. 3 and 4, the front fender 2 and the grille 4 may be arranged such that curved portions 6a and 6b are located in between apexes 2a and 4a of the front fender 2 and the grille 4, respectively, along the direction defined by line B.

As shown in FIG. 3, the radiator 19 is located in front of the shock absorber 9. However, other elements of the engine (not shown) can also be located forward of the shock absorber.

Figure 5:
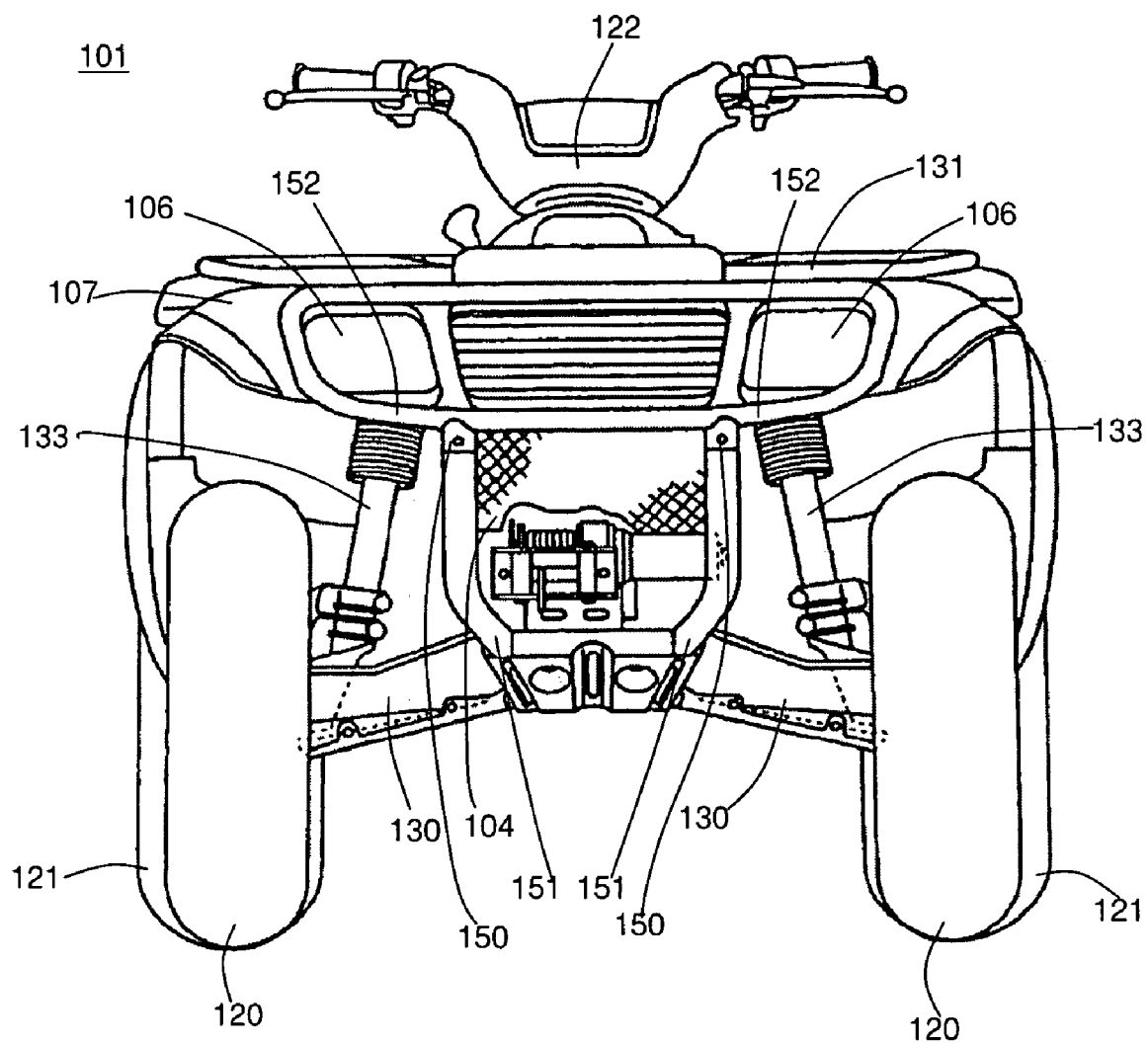
FIG. 5 shows a known ATV.

Because of the arrangement of the front fender 2, the front carrier bar 3, the grille 4, and the air intake shroud 8, there is increased airflow to the radiator 19 as compared to the arrangement shown in FIG. 5 because the airflow to the radiator 19 is not obstructed in the manner shown in FIG. 5.

Also, because the front fender, the carrier bar, and the grille all have the same substantially V-shaped configuration and the apexes of the substantially V-shaped front fender, the substantially V-shaped front carrier bar and the substantially V-shaped grille are substantially aligned along a common vertical axis, airflow is greatly improved and the various elements of the ATV located at the front thereof are much better protected.

It should be understood that the foregoing description is only illustrative of preferred embodiments of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. A vehicle comprising:
    a substantially V-shaped front fender;
    a substantially V-shaped front carrier bar;
    a substantially V-shaped grille; wherein
    apexes of the substantially V-shaped front fender, the substantially V-shaped front carrier bar and the substantially V-shaped grille are substantially aligned along a common vertical axis; and
    an outer end of the substantially V-shaped front bar carrier is located behind a front portion of at least one of the substantially V-shaped grille and the substantially V-shaped front fender.

2. The vehicle according to claim 1, wherein the substantially V-shaped front carrier bar includes left and right upwardly bent portions extending from the apex thereof.

3. A vehicle comprising:
    a substantially V-shaped front fender;
    a substantially V-shaped front carrier bar;
    a substantially V-shaped grille; wherein
    apexes of the substantially V-shaped front fender, the substantially V-shaped front carrier bar and the substantially V-shaped grille are substantially aligned along a common vertical axis;
    the substantially V-shaped carrier bar includes two substantially parallel bars connected to each other by curved end portions; and
    the substantially V-shaped carrier bar includes two substantially vertically extending support bars attached to the two substantially parallel bars, and an air intake shroud is disposed between the two substantially vertically extending support bars.

4. The vehicle according to claim 3, wherein at least a portion of the substantially vertically extending support bars is located behind a front portion of the substantially V-shaped front fender.

5. A vehicle comprising:
    a substantially V-shaped front fender;
    a substantially V-shaped front carrier bar;
    a substantially V-shaped carrier; wherein
    apexes of the substantially V-shaped front fender, the substantially V-shaped front carrier bar and the substantially V-shaped grille are substantially aligned along a common vertical axis; and at least one element of an engine of the vehicle is located forward of a front suspension system including a front shock absorber.

6. The vehicle according to claim 5, wherein the at least one element of an engine of the vehicle is an engine cooling apparatus.

7. The vehicle according to claim 1, wherein the substantially V-shaped front fender and the substantially V-shaped front carrier bar have substantially the same shape and are substantially parallel to each other.

8. The vehicle according to claim 1, wherein the apex of the substantially V-shaped front fender and one of the apexes of the substantially V-shaped front carrier bar are located at a common vertical height.

9. The vehicle according to claim 1, wherein the apexes of the substantially V-shaped front fender, the substantially V-shaped front carrier bar and the substantially V-shaped grille are substantially aligned along a common horizontal axis.

* * * * *